United States Patent [19]

Chasar

[11] 4,434,265
[45] Feb. 28, 1984

[54] METACYCLOPHANE, SYNTHESIS THEREOF, AND COMPOSITIONS STABILIZED THEREBY

[75] Inventor: Dwight W. Chasar, Northfield, Ohio

[73] Assignee: The B.F. Goodrich Company, Akron, Ohio

[21] Appl. No.: 504,755

[22] Filed: Jun. 15, 1983

[51] Int. Cl.³ .................. C07C 39/12; C07C 39/24; C08K 5/13

[52] U.S. Cl. .................................. 524/339; 524/342; 568/640; 568/720

[58] Field of Search .............. 568/640, 720; 524/339, 524/342; 260/810

[56] References Cited

U.S. PATENT DOCUMENTS 4,277,600  7/1981  Mark et al. .................... 568/720
4,319,051  3/1982  Suenobu et al. ................ 568/720

OTHER PUBLICATIONS

C. David Gutsche et al., "Calixarenes II. The Isolation and Characterization of the Calix[4] Arene and the Bishomooxa Calix[4] Arene from a p–t.Butyl Phenyl–Formaldehyde Condensation Product", Tetrahedron Letters No. 24, pp. 2213–2216 (1979).

*Primary Examiner*—Veronica P. Hoke
*Attorney, Agent, or Firm*—Alfred D. Lobo; Nestor W. Shust; Alan A. Csontos

[57]         ABSTRACT

[1.1.1.1.]metacyclophane is a cyclic compound consisting of two alkane bisphenol molecules coupled through their available ortho positions by a methylene moiety. The cyclic compound is initially formed as a dihydrate by reaction of a 2,2'-di-substituted alkane bisphenol such as a 2,2'-di-t.butylated alkane bisphenol with paraformaldehyde at about 170° C. in an aromatic solvent. The dihydrate may be dehydrated under select conditions. The cyclic compound is an excellent antioxidant in mineral filled natural rubber, and in polyolefins, particularly in polypropylene.

11 Claims, No Drawings

METACYCLOPHANE, SYNTHESIS THEREOF, AND COMPOSITIONS STABILIZED THEREBY

BACKGROUND OF THE INVENTION

Organic materials, whether natural or synthetic, are conventionally protected against degradation by oxidation and by ultraviolet light and/or heat by incorporating a stabilizer in the materials. The choice of a stabilizer depends upon what particular source of degradation is to be countered, the type of material in which the degradation occurs, and the proposed length of time for which protection is sought under expected conditions.

This invention is particularly directed to the protection of organic materials against degradation by oxidation at temperatures below about 200° C. for relatively short periods of time, and at ambient temperatures for extended periods of time. The compounds of this invention belong to a well-recognized class of antioxidants termed hindered phenols', which as the term implies, possess an OH group which may be either partially or totally hindered by adjacent substituents on the phenol molecule. Compounds which serve as antioxidants are disclosed in *Atmospheric Oxidation and Antioxidants* by Gerald Scott, Elsevier Publishing (1965); *Antioxidants Syntheses and Applications* by Johnson, J.C., Noyes Data Corporation (1975); and other publications.

Much work has been done in this art, and much has been written to explain the complex chemical reactions which occur when a material loses its structural integrity, flexibility or resilience, or becomes discolored. Much has been written to account for the stabilizing effects of hindered phenols, and the probable mechanisms by which these occur. Despite all the work and teachings related to it, the simple fact is that the stabilizing action of hindered phenols is unpredictable.

Recognizing that most of the major developments in this field have been the products of a well-directed empiricism, and further, that the synthetic polymer industry has absorbed much of the teachings from the rubber industry where hindered phenols have long been favored, it is nevertheless surprising that four (4) hindered phenol moieties may be linked to form a cyclic compound which has the best characteristics of the most effective hindered phenols even when used in different media. As those skilled in the art are well aware, stabilizers which are effective in natural or synthetic rubber are usually ineffective in other synthetic resinous materials.

Some examples of phenolic antioxidants are 2,6-di-t-butylphenol; 2-methyl-4,6-dinonyl phenol; 2,6-di-t-butyl-p-cresol; 2,2'-methylene-bis-(4-methyl-6-t-butyl phenol); 1,1'-methylene-bis-(2-naphthol); 4,4'-methylene-bis-(2,6-di-t-butyl phenol); 4,4'-thio-bis (6-t-butyl-m-cresol); and the like. Although any phenolic antioxidant used in combination with the substituted metacyclophanes would improve the heat and oxygen stability of the compositions the more preferred phenolic antioxidants are those having alkylhydroxyphenyl substituents on an ester or a heterocyclic nucleus.

Particular examples of phenolic antioxidants having alkylhydroxyphenyl substituents on an ester nucleus are compounds disclosed in U.S. Pat. No. 3,330,859 exemplified by di-lauryl α,α'-bis(3,5-di-butyl-4-hydroxybenzyl)malonate; and disclosed in U.S. Pat. No. 3,627,725 exemplified by tetrakis (methylene-3-(3',5'-di-t-butyl-4'-hydroxyphenyl)propionate) methane; and the like.

Examples of phenolic antioxidant compounds having alkylhydroxyphenyl substituents on a heterocyclic nucleus are compounds where the heterocyclic nucleus is a triazine nucleus such as compounds disclosed in British Pat. No. 977,589 and exemplified by 2,4,6-tris(4-hydroxy-3,5-di-t-butyl benzylthio)-1,3,5-triazine; compounds disclosed in U.S. Pat. No. 3,706,740 and exemplified by 2,4,6-tris(3',5'-di-t-butyl-4'-hydroxybenzyl)-1,3,5-triazine; disclosed in U.S. Pat. No. 3,567,724 and exemplified by hexahydro-1,3,5-tris[3,5-di-t-butyl-4-hydroxyphenyl) propionyl]s-triazine; disclosed in U.S. Pat. No. 3,694,440 and exemplified by 1,3,5-tris(4'-hydroxy-3',5'-di-t-butylphenylpropionyloxyethylthiopropionyl)hexahexahydro-1,3,5-triazine; and the like.

Examples of phenolic antioxidant compounds having alkylhydroxyphenyl substituents on an isocyanurate nucleus are compounds of the formula disclosed in U.S. Pat. No. 3,531,483 and exemplified by tris-(3,5-di-t-butyl-4-hydroxybenzyl) isocyanurate; disclosed in U.S. Pat. No. 3,678,047 and exemplified by 2,2'2''-tris(3-(3,5-di-t-butyl-4-hydroxyphenyl)propionyloxy)ethyl isocyanurate; and the like.

Still other hindered phenols useful as thermal antioxidants are disclosed in U.S. Pat. Nos. 3,920,659; 4,069,195; and 4,326,061 which are incorporated herein by reference as if fully set forth.

It is known that p-t-butylphenol and formaldehyde, when base-catalyzed, yield a series of cyclic compounds made up of tetramers, bishomooxa tetramers, octamers, and the like, which have been the subject of a detailed investigation, reported in a series of articles one of which is *Calixarenes. II. The Isolation and Characterization of the Calix [4]arene and the BishomooxaCalix[4]arene from a p-t-Butylphenol-Formaldehyde Condensation Product*, by Gutsche, David C. et al, *Tetrahedron Letters*, No. 24, pp 2213–2216 (Pergamon Press Ltd., 1979). These compounds, when appropriately functionalized, have the ability to form complexes which are enzyme model candidates. As will immediately be evident, these calixarenes have their OH groups within the 'main ring', that is, the ring formed by the plural butylphenol molecules, and the condensation reaction occurs under base-catalyzed conditions, while the synthesis of this invention, as described hereafter, is non-catalyzed. It will also be evident that formaldehyde (normally available as an aqueous solution) and paraformaldehyde (normally a solid consisting essentially of polymers of formaldehyde) behave quite differently even if they are related compounds.

SUMMARY OF THE INVENTION

It has been discovered that a non-catalytic reaction of a 2,2'-di-substituted alkane bisphenol such as 2,2'-di-t-butyl-bisphenol A with paraformaldehyde at elevated temperature in an aromatic solvent, yields a high melting cyclic compound forming a main ring consisting of two bisphenol molecules coupled through each of the available ortho positions by amethylene moiety. The main ring is positioned between flanking OH groups of a cyclic dihydrate which may be dehydrated under elevated temperature under reduced pressure.

It has further been discovered that the cyclic compound, named [1.1.1.1.]metacyclophane (hereafter "metacyclophane", for brevity), is an excellent antioxidant both in rubber and in polypropylene, exhibiting especially good antioxidant activity at a temperature of about 150° C. for a prolonged period of time.

It is therefore a general object of this invention to provide a process for the preparation of metacyclophane comprising reacting a 2-2'-disubstituted bisphenol with paraformaldehyde at a temperature in the range from about 120° C. to about 200° C. at a pressure in the range from about 1 to about 8 atmospheres, in the presence of a mutual solvent for said bisphenol and formaldehyde, and, recovering a solid reaction product.

It is also a general object of this invention to provide a stabilized composition of matter comprising an organic material subject to degradative attack by oxygen, and an effective amount, sufficient to counter said attack, of a solid reaction product prepared by the foregoing process.

It is a specific object of this invention to provide a novel compound identified as metacyclophane represented by the structure

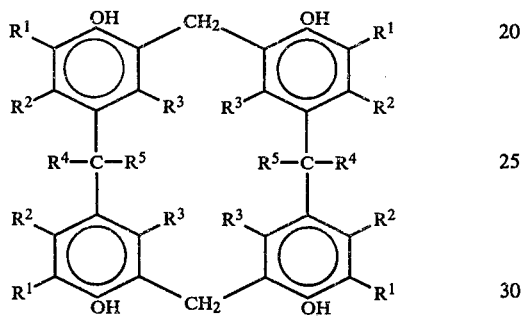

wherein, $R^1$, $R^2$, $R^3$, $R^4$ and $R^5$ may each be the same or different and represent halogen, particularly chlorine or bromine; lower alkyl having from 1 to about 18 carbon atoms; alkoxy having from 1 to about 18 carbon atoms; and, hydrogen; except that $R^1$ cannot be hydrogen.

DETAILED DESCRIPTION OF PREFERRED EMBODIMENTS

The compound of this invention is conveniently prepared from commercially easily available raw materials, namely (i) bisphenol A, or an alkylene bisphenol wherein the alkylene group has from 1 to about 4 carbon atoms, such as methylene bisphenol; (ii) a monoolefin having from 2 to about 10 carbon atoms, particularly isobutylene; and, (iii) paraformaldehyde.

It is critical that, prior to reaction with paraformaldehyde, a bisphenol reactant be provided with a substituent on only one of the positions ortho to the OH group on each phenol moiety. This may be done by alkylation, alkoxylation, halogenation, or any other conventional reaction which will yield the desired ortho-compound, alkylation being most preferred. The substitutions at other positions are not critical, such substitution being mostly to affect the specificity of the subsequent reaction with paraformaldehyde to form the cyclic compound containing four phenolic ("4-P") moieties with the OH groups positioned outside the 4-P ring.

Alkylation, which is most preferred, of the bisphenol, produces a mixture of alkylated products which is then separated to yield the desired ortho-substituted bisphenol ("OBP") having one substituted and one unsubstituted ortho position, which configuration is essential for the formation of metacyclophane.

In a specific instance, bisphenol A is butylated under acid catalytic conditions to yield a mixture of butylated materials I, II and III and cleavage products, as represented below, the largest component being 4,4'-isopropylidene-bis(2-t-butylphenol), identified as (I).

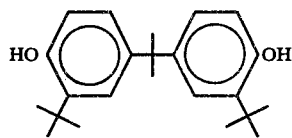

I

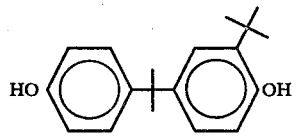

II

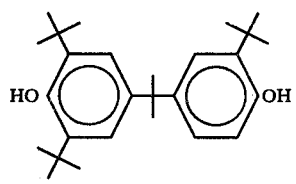

III

An examination of the structure (I) shows that each ortho-substituted phenol moiety ("OPM") is swivelable about the methylene carbon atom bridging them. It will further be apparent that a reaction of (I) with paraformaldehyde will likely yield a wide array of condensation products, including oligomers and polymers of the reactants, one of which products, from a statistical point of view, might result in two bisphenol moieties being bridged with one or more methylene groups.

Clearly, to bias the statistical possibility in favor of such an occurence, it will be most preferred to separate (I) from the other reaction products. This is preferably done by stirring the reaction mass in a hydrocarbon solvent, most preferably an alkane such as hexane, at room or elevated temperature, and crushing all the lumps of solid. Upon filtering the mixture, a white solid is obtained as the residue. This white solid is extracted with hot hexane which preferentially extracts (I), leaving a solid which is identified as (II).

In an analogous manner, other substituted bisphenol compounds may be prepared which necessarily have two ortho positions substituted, one ortho position on each phenolic moiety being left unsubstituted. Compounds so formed may be represented by the structural formula

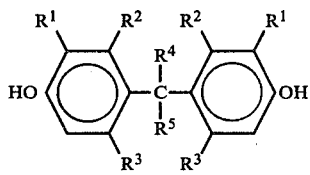

IV wherein $R^1$, $R^2$, $R^3$, $R^4$ and $R^5$ may each be the same or different and represent halogen, particularly chlorine or bromine; lower alkyl having from 1 to about 18 carbon atoms, without regard for the spatial configuration such as normal, iso or tertiary; alkoxy having from 1 to about 18 carbon atoms; and, hydrogen, except that $R^1$ cannot be hydrogen. The alkyl substituents may be acyclic or cyclic, including alkyl-substituted cyclic, as long as the total carbon content conforms to the defined amount, and the same is true for alkoxy groups. The substituents may be the same or different, though it will be apparent that alkylation of the bisphenol as described hereinabove, to provide OBP having the structure (I) will have the same ortho substituent.

The object is for form a metacyclophane. This term "metacyclophane" is used to name the 4-P ring compound without regard to the substituents on the phenyl rings, or those on the bridge between the phenyl rings of each OBP. The reaction to form a metacyclophane by reacting (IV) with paraformaldehyde is preferably carried out in an aromatic or aliphatic solvent which is inert relative to the reactants in the temperature range of from about 120° C. to about 200° C. in which range the reaction occurs best under pressure and without a catalyst. Such solvents are benzene, toluene and xylene, and alkanes having from 5 to about 10 carbon atoms. Most preferred is xylene.

In the specific instance where the OBP (I) is to be reacted with paraformaldehyde, the reaction is most preferably carried out in xylene as the solvent, at about 175° C. under autogeneous pressure, and the reaction is found to produce metacyclophane dihydrate having the structure (V) herebelow, where the precise linking of the phenolic OH groups with the water molecules is not given. Elevated pressure in the range of from about 2 to about 8 atmospheres appears to give the best results, though still higher pressure may be justified if it was economical.

A laboratory preparation of [1.1.1.1]metacyclophane dihydrate having the structure (V) is as follows:

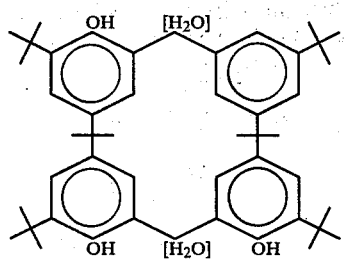

V 100 g (0.293 mol) of (I) and 10.6 g (0.353 mol) paraformaldehyde were charge to a 1780 ml stainless steel autoclave containing xylene and heated at 175° C. for 12 hr. The reaction mass is then cooled, filtered, and the solvent removed under vacuum. A yellow friable glassy material results. This material is stirred in acetonitrile for about an hour, after which time a white powder remains. Upon filtration, a white solid is recovered which has a melting point (m. pt.) of 325°–330° C. Additional material is recovered by concentration of the acetonitrile to provide a yield of 20 g of (V).

An analytical sample of (V) is obtained by column chromatographing 2g of (V) on 150 g of 0.063—0.2 mm silica gel (obtained from ICN Pharmaceuticals, Inc.) using as eluent 1:3 ratio of hexane : chloroform in a 4×30 cm column.

Calculated analysis for $C_{48}H_{64}O_4 \cdot 2H_2O$ is: C=77.84; H=9.19. Found: C=78.05; H=9.13.

IR analysis (Nujol): Absorptions at 3460, 3570 and 3615 cm$^{-1}$ (OH groups) and, 1180–1200 cm$^{-1}$(Ar-O)

Field desorption mass spectrography (FD/MS) gives a mol wt of 704.

A Karl Fischer determination for water gave 4% (theory is 4.8%).

The molecules of $H_2O$ are represented in the structure as being associated with the OH groups at each end, though it is not certain whether the molecules of water may be associated in a different manner. Though two (2) molecules of $H_2O$ are represented it will be evident that either one or both may be present if one or the other are removed selectively, or both.

The water from the complex (V) may be removed as follows: 0.5 g of (V) was dissolved in deoxygenated chloroform (10 ml) and a small chunk of $CaH_2$ was added. Rapid bubbling occurred for about an hour. Upon filtration and evaporation of the filtrate by a stream of nitrogen, a yellow glassy material was obtained. This glassy material was stirred in acetonitrile for about 15 mins, filtered and dried to give a light colored powder (0.25g) the structure of which was confirmed by analysis to be that of [1.1.1.1]metacyclophane monohydrate, which is further dehydrated by heating at 110° C. at 2 mm Hg. The dehydrated structure (V) may also be more correctly named 5,11,17,23-tetra(1,1-dimethylethyl)-2,2,14,14-tetramethylpentacyclo[19.3.1.1.$^{3,7}$-1.$^{9,13}$1$^{15,19}$]octacosa-1(25),3,5,7(28),9,11,13(27),15,17,19(26),21,23-dodecane-6.10,18,22-tetrol.

Molecules of the foregoing structure could mimic, in vitro, the catalytic activity of enzymes due to the complexing ability of the dual OH groups at opposite sides of the cavity-like structure.

The metacyclophanes are generally high melting crystalline solids soluble in acetone, diethyl ether, dioxane, tetrahydrofuran, carbon tetrachloride, chloroform, lower primary alcohols having from 1 to about 5 carbon atoms such as methanol, ethanol and propanol, aromatic hydrocarbons such as benzene and toluene, but much less soluble in aliphatic hydrocarbons such as hexane. Substituted metacyclophanes are generally insoluble in water; they range in color from white to dark brown when pure.

The amount of the metacyclophane used as a stabilizer will vary with the particular organic material to be stabilized and also the particularly substituted metacyclophane employed. Generally however, for effective stabilization of organic materials against oxidation, an amount of the metacyclophane used in the range from about 0.001 percent to about 10 percent by weight (% by wt) based on the weight of organic material. In typical stabilized compositions the amount of metacyclophane used is in the range from about 0.01 to about 5% by wt.

Compositions of this invention are both natural and synthetic organic materials, particularly resinous materials which have been stabilized to combat the deleterious effects of oxidative degradation such as is usually evidenced by discoloration and/or embrittlement. Such compositions are also desirably stabilized against degradation due to heat and actinic light, and therefore generally include additional, secondary stabilizers to achieve greater stability (hence such secondary stabilizers are referred to as "synergists"). Such synergists may be present in the range from about 0.1 part to about 10 parts by wt, and preferably from about 0.2 part to about 5 parts by wt per 100 parts by wt of the organic continuous phase.

Of several types of known UV synergists, particularly favored are those disclosed in U.S. Pat. Nos. 3,325,448; 3,769,259; 3,920,659; 3,962,255; 3,966,711; and 3,971,757; inter alia.

When used, antioxidant synergists, whether only one, or more than one is used as a secondary antioxidant, range from about 0.1 part to about 20 parts by weight, preferably from about 0.2 part to about 5 parts by weight per 100 parts by weight of the material. Among secondary antioxidants used are phosphite, phosphate, sulfide and phenolic antioxidants, the first and last being preferred. Most preferred are phenolic antioxidants such as 2,6-di-t-butyl paracresol; 2,2'-methylene-bis-(6-t-butyl-phenol); 2,2'-thiobis-(4-methyl-6-t-butyl-phenol); 2,2'-methylene-bis-(6t-butyl-4-ethyl-phenol); 4,4'-butylene-bis-(6-t-butyl- m-cresol); 2-(4-hydroxy-3,5-di-t-butylanilino)-4,6-bis-(octylthio)-1,3,5-triazine; hexahydro-1,3,5-tris-(3,5-di-t-butyl-4-hydroxyphenyl)-propionyl-s-triazine; hexahydro-1,3,5-tris-(3,5-di-t-butyl-4-hydroxybenzyl) isocyanurate; tetrakismethylene-3-(3',5'-di-t-butyl-4'-hydroxyphenyl)propionate methane; and other antioxidant synergists such as distearyl thiodipropionate; dilauryl thiodipropionate; tri(nonylphenyl) phosphite; tin thioglycolate; and particularly commercially available antioxiants such as Goodrite$^R$ 3114, and 3125, Irganox 1010, 1035, 1076 and 1093. Other ingredients such as pigments, tackifiers, flame retardants, fungicides, and the like may also be added.

Organic materials which may be thus stabilized against thermal, uvlight and/or particularly oxidative degradation, include copolymers of butadiene with acrylic acid, alkyl acrylates or methacrylates, polyisoprene, polychloroprene, and the like; polyurethanes; vinyl polymers known as PVC resins such as polyvinyl chloride, copolymers of vinyl chloride with vinylidene chloride, copolymers of vinyl halide with butadiene, styrene, vinyl esters, and the like; polyamides such as those derived from the reaction of hexamethylene diamine with adipic or sebacic acid; epoxy resins such as those obtained from the condensation of epichlorohydrin with bisphenols, and the like; ABS resins, polystyrene, polyacrylonitrille, polymethacrylates, polycarbonates, varnish, phenol-formaldehyde resins, polyepoxides, polyesters, and polyolefin homo- and copolymers such as polyethylene, polypropylene, ethylenepropylene polymers, ethylene-propylenediene polymers, ethylene-vinyl acetate polymers, and the like. The substituted metacyclophanes can also be used to stabilize mixtures and blends of polymeric materials such as ABS resin blends, PVC and polymethacrylate blends, and blends of polyolefin homopolymers and copolymers such as blends of polypropylene in EPDM polymers.

Many known compounding ingredients may be used along with the metacyclophanes in stabilized compositions. Such ingredients include metal oxides such as zinc, calcium and magnesium oxide, fatty acids such as stearic and lauric acid, and salts thereof such as cadmium, zinc and sodium stearate and lead oleate; fillers such as calcium and magnesium carbonate, calcium and barium sulfates, aluminum silicates, asbestos, and the like; plasticizers and extenders such as dialkyl and diaryl organic acids like diisobutyl, diisooctyl, diisodecyl, and dibenzyl oleates, stearates, sebacates, azelates, phthalates, and the like, ASTM type 2 petroleum oils, paraffinic oils, castor oil, tall oil, glycerin, and the like.

The metacyclophanes, and the other compounding ingredients if used, can be admixed with organic materials using known mixing techniques and equipment such as internal mixing kettles, a Banbury mixer, a Henschel mixer, a two-roll mill, an extruder mixer, or other standard equipment, to yield a composition which may be extruded, pressed, blowmolded or the like into film, fiber or shaped articles. Usual mixing times and temperatures can be employed which may be determined with a little trial and error for any particular composition. The objective is to obtain intimate and uniform mixing of the components. A favorable mixing procedure to use when adding a metacyclophane to an organic material is either to dissolve or suspend the compound in a liquid such as hexane or benzene before adding it, or to add the metacyclophane directly to the polymeric organic material, or to extruder-mix the metacyclophane and the polymeric material prior to forming the product.

Samples of the compositions are evaluated for oxidative and thermal stability by ASTM Standard Methods for Rubber. The results, measuring the time to discoloration and/or embrittlement of samples after aging in an air circulating oven at 125° C. and 150° C. (comparing samples containing commercially successful antioxidants, and [1.1.1.1]metacyclophane), are presented in Table I herebelow. Degradation of the samples can be followed by periodically measuring tensile strength left, and other standard ASTM tests. Failure of the sample may also be checked by visual signs of cracking when a sample is bent 180°.

With specific regard to mineral filled natural rubber such as is used in the white sidewalls of automobile tires, metacyclophane and Agerite Superlite (a commercially successful antioxidant) were each tested, a comparsion set forth in Table I hereinbelow showing that the stabilized rubbers each retained a similar percentage of its original physical properties, and the composition containing metacyclophane has better color retention after 24 hr exposure to a standard RS sun lamp.

TABLE I

| Compound ingredients | mix #1 | mix #2 | mix #3 |
| --- | --- | --- | --- |
| Natural rubber (SMR-5) | 100 | 100 | 100 |
| Reogen | 2 | 2 | 2 |
| Stearic Acid | 2 | 2 | 2 |
| Zinc Oxide | 5 | 5 | 5 |
| Dixie Clay | 50 | 50 | 50 |
| Atomite | 50 | 50 | 50 |
| TiO$_2$ | 20 | 20 | 20 |
| Sulfur | 2.75 | 2.75 | 2.75 |
| Altax | 1 | 1 | 1 |
| Methyl Tuads (accelerator) | 0.1 | 0.1 | 0.1 |
| AR Superlite Solids (antioxidant) | — | 1.5 | — |
| [1.1.1.1]metacyclophane | — | — | 1.5 |
| PHYSICAL PROPERTIES | | | |
| Press Cures at 153° C. (307° F.) Cured for 10 min. | | | |
| 300% modulus,psi | 680 | 700 | 720 |
| Tensile, psi | 2540 | 2660 | 2460 |
| % Elongation | 610 | 610 | 580 |
| Hardness | 60 | 60 | 60 |

The following data were obtained after aging samples in test tubes according to the procedure set forth in Determination of Heating in Air (test tube procedure) ASTM D-865.

| | AFTER AGING TWO (2) DAYS IN TEST TUBES @ 100° C. | | |
| --- | --- | --- | --- |
| Tensile, % retained | 28 | 61 | 59 |
| Elongation, % retained | 57 | 77 | 72 |
| Hardness, pts. change | −4 | +4 | +5 |
| | AFTER AGING FOUR (4) DAYS IN TEST TUBES @ 100° C. | | |
| Tensile, % retained | 17 | 34 | 39 |
| Elongation, % retained | 28 | 53 | 55 |

|  | -continued |  |  |
|---|---|---|---|
| Hardness, pts. chage | −4 | +3 | +5 |
| COLOR -BEFORE AND AFTER 24 HR UNDER U-V LAMP | | | |
| Unexposed | white | white | white |
| Exposed | lt. yellow | yellow | lt. yellow |
| MOONEY SCORCH @ 121° C. | | | |
| Mins. to 5 point rise | 33 | 37 | 31 |
| Plasticity | 12 | 14 | 13 |
| RHEOMETER @ 153° C. 30 min motor, 60 sec preheat, 100 range, 3° Arc | | | |
| T90 min | 5.4 | 5.6 | 5.1 |
| T2 min | 3.1 | 3.3 | 2.8 |

In synthetic rubber, metacyclophane was equivalent to butylated hydroxytoluene (BHT) after oven-aging at 70° C. for 10 days but does not leach out as readily as BHT.

In petroleum based stocks such as Gulf Oil's PAO, Emery Corp.'s 2960, and Hercules Chemical's Hercolube A, metacyclophane is not as effective an antioxidant as some commercially successful products.

In the following Table II is set forth a comparison setting forth average days to failure of three (3) polypropylene (Profax 6501) specimens into each of which was mixed equal amounts (0.1 part by wt) of stabilizer per hundered parts resin, ('phr').

TABLE II

| Stabilizer (0.1 phc) | Days to Failure* | |
|---|---|---|
|  | at 125° C. | at 150° C. |
| Goodrite 3114 | 44 | 1.3 |
| [1.1.1.1]metacyclophane | 44 | 3. |
| crude reaction product** | 35 | 3. |

*average of three (3) 25 mil thick plaques
**from reaction mass for making [1.1.1.1]metacyclophane In the following Table III is set forth a comparison of evaluations of samples of 20 mil thick plaques of polypropylene containing a commercially successful antioxidant (Vanox GT) and [1.1.1.1]metacyclophane, when each antioxidant is used in conjuction with a secondary antioxidant (synergist) which produces a synergistic effect.

TABLE III

| Componenets | Set #1 | Set #2 |
|---|---|---|
| Polypropylene (Profax 6501) | 100 | 100 |
| Vanox GT | 0.1 | — |
| [1.1.1.1]metacyclophane | — | 0.1 |
| DSTDP* (sec.antiox.) | 0.3 | 0.3 |
| Color | white | white |
| Oven aging at 150° C. (hr to failure) | 1836 | 900 |

*Distearylthiodipropionate

I claim:

1. The compound metacyclophane represented by the structure

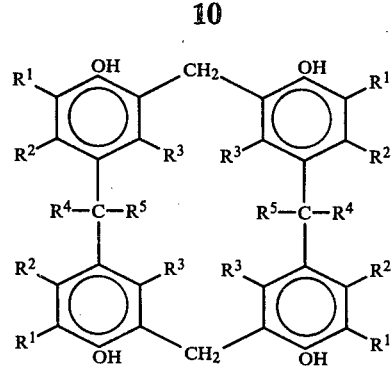

wherein, $R^1$, $R^2$, $R^3$, $R^4$ and $R^5$ may each be the same or different and represent halogen; alkyl having from 1 to about 18 carbon atoms; alkoxy having from 1 to about 18 carbon atoms; and, hydrogen; except that $R^1$ cannot be hydrogen.

2. The monohydrate or dihydrate of the compound of claim 1.

3. The compound [1.1.1.1]metacyclophane of claim 1, wherein, $R^1$ is selected from the group consisting of lower alkyl having from 1 to about 6 carbon atoms, and, $R^2$, $R^3$, $R^4$ and $R^5$ are each hydrogen.

4. The monohydrate or dihydrate of the compound of claim 3.

5. The compound of claim 3 wherein $R^1$ is t-butyl.

6. A composition of matter comprising an organic material subject to degradative attack by oxygen, and an effective amount, sufficient to counter said attack, of a solid reaction product recovered from reacting a 2-2'-disubstituted-bisphenol with paraformaldehyde at a temperature in the range from about 120° C. to about 200° C., at a pressure in the range from about 1 to about 8 atmospheres, in the presence of a mutual sovent for said bisphenol and formaldehyde said compound, metacyclophane, represented by the structure

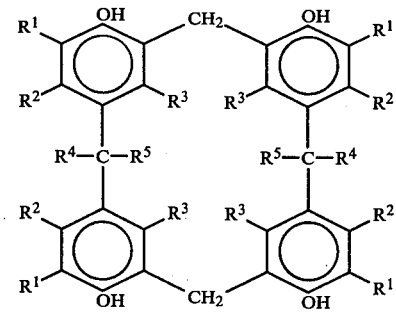

wherein, $R^1$ $R^2$, $R^3$, $R^4$ and $R^5$ may each be the same or different and represent halogen; alkyl having from 1 to about 18 carbon atoms; alkoxy having from 1 to about 18 carbon atoms; and, hydrogen; except that R'cannot be hydrogen.

7. The composition of matter of claim 6 wherein said reaction product comprises metacyclophane dihydrate.

8. The composition of claim 6 wherein said metacyclophane is [1.1.1.1]metacyclophane present in an amount in the range from about 0.001 to about 10 percent by weight based on the weight of said organic material.

9. The composition of claim 6 wherein said organic material is selected from homopolymers and copolymers of ethylene, propylene, isobutylene, 1-butene, 1-pentene, 1-hexene, 4-methyl-1-pentene, and diene monomers.

10. The composition of claim 6 including at least one other secondary antioxidant compound in an amount sufficient to produce a synergistic antioxidant effect.

11. The composition of claim 6 wherein said organic material is selected from homopolymers and copolymers of alpha-monoolefins, and diene monomers.

* * * * *